Nov. 18, 1952  C. J. NOELLE  2,617,994
PROSTHETIC DEVICE
Filed June 3, 1950
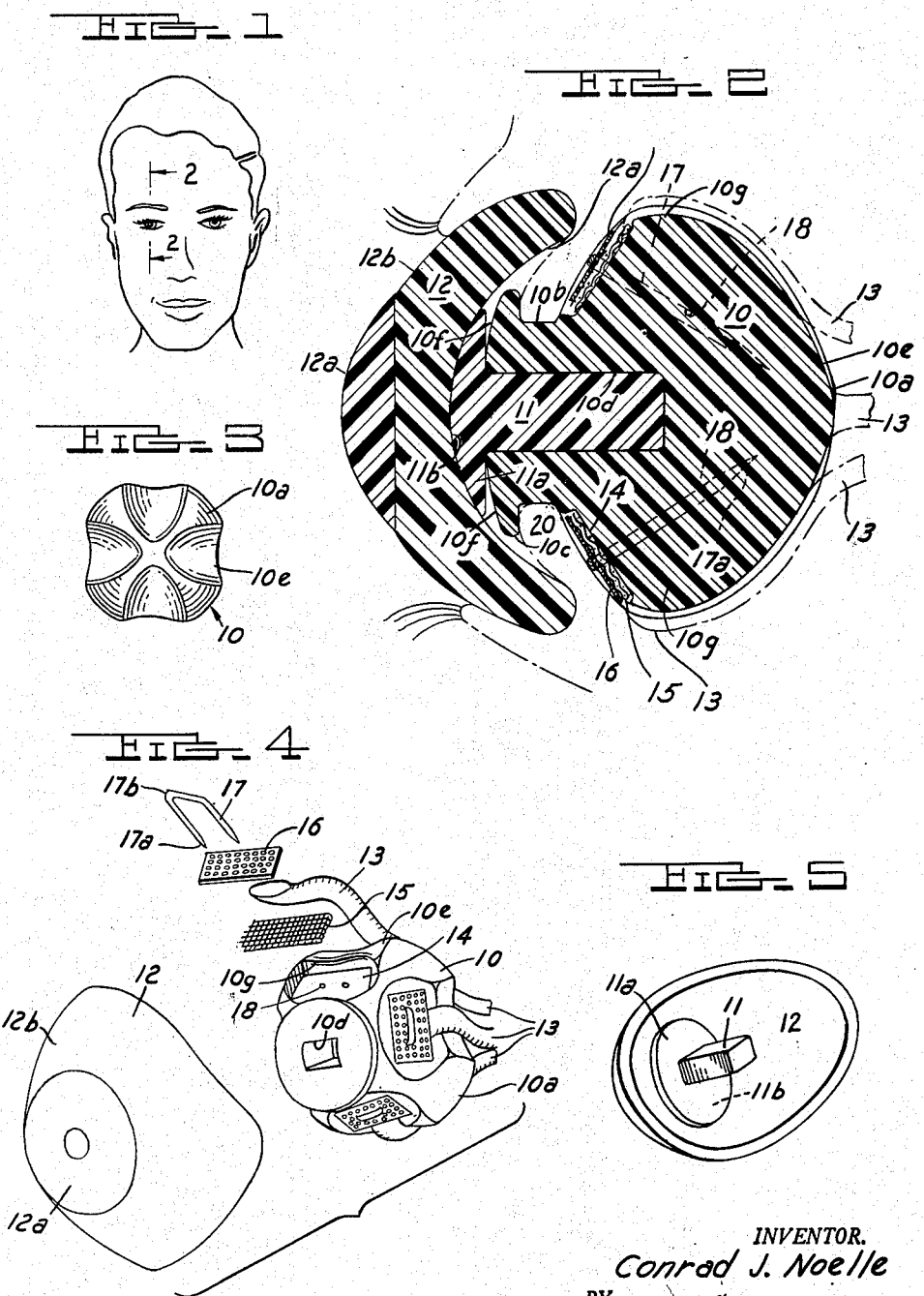
INVENTOR.
Conrad J. Noelle
BY Farley Forster & Farley
ATTORNEYS Patented Nov. 18, 1952

2,617,994

UNITED STATES PATENT OFFICE 2,617,994

PROSTHETIC DEVICE

Conrad J. Noelle, Detroit, Mich., assignor to Fritz W. Jardon, doing business as The Fritz Jardon Prosthetic Laboratories, Detroit, Mich.

Application June 3, 1950, Serial No. 165,960

17 Claims. (Cl. 3—13)

This invention relates to prosthetic devices and particularly to artificial eyes.

In recent years the practice has developed, when a patient is fitted or supplied with an artificial eye for any cause whatsoever, of securing the principal muscles, which control the movement of the natural eye, after the latter has been removed from the eye socket, to a substantially spherical foundation member known as an implant to which is detachably secured the artificial eye proper; namely, that portion which is exposed to view and is provided with simulated iris, pupil and cornea portions, and so that when the patient has been equipped with a complete artificial eye the latter will be moved by the eye muscles in a natural manner in synchronism with the patient's remaining good eye. Up to the present time various means have been employed for securing the principal eye muscles, known as the rectus muscles, to the implants, but they have not proved to be entirely satisfactory. For example, one of the means heretofore proposed and employed for securing the rectus muscles to the implant consisted of a plurality of sharp pointed prongs upon which the end of each rectus muscle was impaled after being severed from the patient's natural eye as the latter was removed from the socket and the prongs were then bent down over the muscular tissue to clinch the prong upon the muscle. With this type of construction it was very difficult to imbed the sharp points of the prongs sufficiently after each prong was bent over or clinched so as to avoid the possibility of the prongs scratching and irritating the adjacent tissues and thus causing considerable discomfort to the wearer as the artificial eye was moved in the socket by the rectus muscles. As the operation of severing and attaching the rectus muscles to the implant is one that must be performed with the greatest possible celerity, there was the omnipresent danger that the operating surgeon might, in his haste to get the operation performed as quickly as possible, neglect to clinch down one of the prongs. Furthermore, due to the fact that the implant is manually held by a surgeon's assistant during the operation, it was very difficult for the surgeon to exert the downward force required to bend such prongs sufficiently to imbed and clinch them into the muscular tissues. In either event, if a sharp point of a prong was left projecting, it could scratch or even tear the surrounding eye tissues as the implant was moved by the rectus muscle, with resulting great discomfort to the wearer.

The present invention has for its object to provide a new and greatly improved construction of an implant for an artificial eye having incorporated therewith a new and improved means for attaching each of the rectus muscles to the implant, which means are so constructed and arranged that the attachment means will be entirely free of any sharp protruding surfaces and in which the possibility of leaving any sharp pointed prongs projecting from the implant will be entirely obviated.

Another object of the invention is to provide an implant for an artificial eye with novel clamping means for attaching the rectus eye muscles thereto in highly efficient and satisfactory manner so that a substantial area adjacent the end of each rectus muscle will be securely clamped on both sides thereof, as distinguished from the prior devices wherein an area on but one side of the muscle was engaged, to the implant by a clamping device so constructed and arranged that in time the portion of the muscle secured by the clamping means will grow and adhere from both sides thereof to the clamping device in such a way as to become permanently attached to the clamp and hence to the implant.

Briefly stated, the invention relates to that type of an artificial eye wherein an implant which, in accordance with the usual construction heretofore employed, has a main body portion in the form of a generally spherical foundation member adapted to fit into the socket of a human eye after the natural eye has been removed.

It is of the utmost importance when a patient is fitted with an artificial eye that the color, size and appearance of the iris, pupil and cornea portions thereof be matched as nearly as possible with the corresponding portions of the patient's good eye, and also that the iris and pupil be properly centered and located to match with the good eye. As it is therefore desirable in order to obtain perfectly satisfactory color matching to compare the artificial eye, after it is fitted to the patient, with the good eye, it may frequently be necessary to try several artificial eyes before the desired color matching is obtained. Furthermore, as the nature of the operation is, as hereinbefore described, such that it is impossible to locate the implant with mathematical accuracy, it is the practice to provide an attachment peg of elongated cross-sectional configuration that can be temporarily secured, as by wax, to the inner surface of the artificial eye, and which peg is adapted to fit into a recessed bore or socket that extends well into the implant; and after the fitting technique has been completed, the peg is permanently cemented to the artificial eye.

The present invention relates to the construction of the implant and more particularly to the means for attaching each of the rectus muscles thereto. The implant of the present invention, in accordance with the usual construction of such members, has a main body portion of generally spherical configuration from the outward side of which projects a reduced neck portion integral with the main body portion and which terminates in an enlarged head or flange, which flange is curved to conform to the inside surface of an artificial eye, all in accordance with the more or less standard type of constructions heretofore commonly employed for such implants. The implant of the present invention, however, has its main body portion provided with a plurality of grooves in the spherical main body into which the tissues of the rectus muscles may be seated. Adjacent to the outer or forward end of each of these grooves, considered with respect to the position of the implant in the patient's eye socket, a rectangular recess or depression is provided in the implant to receive a pair of clamps which may be constructed of tantalum screen wire mesh or made of foraminated thain sheets of suitable plastic or other material. A pair of such foraminated clamps are employed, one of which, in the particular constructional example selected for illustration, consists of a double thickness of tantalum wire mesh permanently secured to the implant; while the other clamp, in order to achieve a firmer clamping action, preferably is formed either of a foraminated plate of thicker material, the end of the rectus muscle, after being severed, is placed between said clamps and a staple or other securing device is thrust through the clamps and the tissue of the rectus muscle and into a pair of holes provided in the body of the implant to hold securely the end of the muscle, confined between the clamps, to the implant, as will be more fully understood from the following more detailed description and by reference to the accompanying drawing, wherein:

Fig. 1 is a front elevation of a patient provided with an artificial eye;

Fig. 2 is a vertical longitudinal section through the artificial eye indicated in Fig. 1 taken on the section line 2—2 thereof;

Fig. 3 is a rear view of the implant shown in Fig. 2 as seen from the right-hand side thereof;

Fig. 4 is an exploded perspective view of the parts shown in Fig. 2 which comprise the assembly of parts; and Fig. 5 is a view of the artificial eye per se as shown from the rear side thereof with the projecting peg member which serves to detachably secure the artificial eye to the implant.

As shown in the drawing, the numeral 10 indicates an implant constructed in accordance with the principles of the present invention. Such implant consists of a generally spherical main body portion 10a which is so formed and dimensioned as to substantially fill the eye socket, leaving no appreciable voids therein, thus enabling added movement to the implant and artificial eye carried thereby to be obtained. At its forward end, the implant has a reduced neck portion 10b formed integral with the main body portion and which terminates or is surmounted by a head portion 10c.

The implant 10 is ordinarily formed of a molded plastic material which, when finished, will present a smooth glass-like outer surface capable of sliding smoothly and without friction upon the surrounding tissues of the human eye socket. Formed into the plastic of the implant in the molding thereof is a recess or socket 10d of elongated rectangular cross-section that is adapted to receive a projecting peg 11 having a head portion 11a, the outer face of which is curved as at 11b for attachment to the substantially spherical inner curved face 12a of the artificial eye 12, the peg 11 being cemented or otherwise suitably secured to the artificial eye 12.

The implant 10 has the main spherical body portion 10a thereof formed with a plurality of, what may be termed, longitudinally extending grooves 10e, shown in Figs. 2 and 3, for the reception of the rectus muscles indicated in Fig. 2 by the reference character 13. Each of these grooves 10e, which at the inner end of the implant merges gradually into the spherical contour of the main body portion 10a of the implant, increases gradually in depth toward the center of said main body portion and terminates at its front end in a rectangular shaped recess 14. Each of the recesses 14 serves to receive a clamping member 15 which in the constructural example selected for illustration is shown as formed of a sheet of thin tantalum wire mesh screen bent over on itself, as shown most clearly in Fig. 4 to provide a double thickness of material.

As there are four rectus muscles, the superior and inferior, located respectively at the top and bottom of the human eye to control vertical movement thereof, and the lateral or external, and internal rectus muscles located towards the exterior and adjacent to the nose respectively, to control horizontal movements of the human eye, the implant 10 is provided with four grooves 10e equally spaced about the main body portion 10a of the implant to receive the four rectus muscles. Each of the clamps 15 has a cooperating clamping member 16 which may also be formed of tantalum mesh, but which is preferably formed of a somewhat thicker sheet of tantalum, plastic or other noncorrosive material suitably foraminated to provide interstices. The end of each of the rectus muscles is securely fastened by means of a staple 17, the legs of which terminate in sharp prongs 17a which are thrust through the clamping members 16 and 15 and through the end of the rectus muscles and are inserted into suitable spaced small holes 18 which are drilled into the main body portion of the implant to extend substantially normal to the plane of the bottom face of recess 14 and clamps 15, 16 and into which the prongs 17a of the staple 17 fit snugly so as to hold the clamps 15 and 16 with the end of the rectus muscle secured therebetween anchored firmly in position to the implant and so cause the same to be moved by said muscles.

The artifical eye 12 per se is constructed in accordance with the usual construction of such devices and is usually made of opaque plastic, glass or other suitable material having an elongated substantially spheroidal configuration, the outer surface of which has a simulated iris and pupil portion 12a colored to match with the patient's natural eye and a simulated cornea portion 12b.

The outer face 10f of the head 10c of the implant is curved or rounded so as to avoid the presence of any sharp edges thereon that would in any way tend to produce irritation of the tissues with which it may contact when the implant is moved in the eye socket by the attachment of the rectus muscles to the implant.

The manner in which the invention operates and the manner of its insertion within the human eye socket and of its attachment to the four rectus muscles is as follows:

The implant 10 having been properly formed in the molding thereof and provided with the grooves 10e, together with the recesses 14 at the forward ends of said grooves, a piece of thin tantalum mesh wire screen or, if desired, a thin foraminated piece of plastic or other suitable material is cut to form, what may be termed, a foundation clamp such as indicated by the clamp 15 of the exact size and shape to fit neatly within the recess 14 when the wire is folded over upon itself, as indicated in Fig. 4, to form two thicknesses. When tantalum mesh screen is used, the two thicknesses of the screen mesh which form the clamp 15 are inserted into the recess 14 and a small heated soldering iron is run around the exterior border of the folded mesh that has been inserted into the recess; and, as the plastic material of which the implant is formed has a low fusing temperature, the plastic material will fuse and flow into the interstices of the screen mesh, thus serving to lodge and secure the clamping member 15 firmly seated within the recess 14 against accidental displacement.

When the surgeon removes the diseased or affected human eye from the patient's socket, it is the usual procedure to make a circular incision in the conjunctiva around the border of the iris and to thread a suture around the space sufficiently inward of the incision to serve in the manner of a drawstring. A surgeon's clamp is then fastened upon each of the rectus muscles after which the muscles are severed from the natural eyeball and the latter is removed from the eye socket. The implant 10 is then inserted into the patient's eye socket and each of the rectus muscles is pulled by the surgeon's clamp attached thereto to seat it within its proper groove 10e formed in the main body of the implant and to draw the end of each muscle over the clamp 15 which has been previously securely seated within the recess 14. The staple 17 which has been previously inserted through the clamp 16 then has the prongs 17a thereof thrust through the end of the rectus muscle and into the holes 18 provided in the main body of the implant, the staples 17 being thrust home into the holes 18 which, as will be noted from an inspection of Fig. 2, are extended sufficiently into the main body of the implant to hold the staples, which fit neatly therein, securely against displacement. After each of the rectus muscles has been clamped securely to the implant by the clamps 15, 16 and staples 17, the drawstring formed by the suture passed through the conjunctiva is drawn to draw the conjunctiva into the neck 10b, an indicated by the reference character 20 in Fig. 2.

As will be seen from an inspection of Fig. 4, the rectangular recess or socket 10d formed in the front portion of the implant lies with its longer sides horizontal when the implant has been secured in the patient's eye socket. The artificial eye 12 per se to which the peg 11 has been temporarily secured, as by wax, is then inserted under the upper and lower eye lids with the peg 11 projecting into and seated within the socket 10d of the implant; and after the color matching and fitting technique has been completed, the peg is permanently attached to the artificial eye by cementing the head portion 11b thereof to the inner surface of the eye. As will be seen from the foregoing, the attachment of the rectus muscles to the implant will cause the artificial eye to be moved by the rectus muscles in synchronism with the patient's natural eye.

Along the line where each of the grooves 10e formed in the main body of the implant merges into the recess 14 provided for the clamp 15, the material of the implant is chamfered away, as indicated at 10g in Fig. 4, so as to avoid the presence of a sharp edge at this point. The staples 17 which are preferably formed of round tantalum wire have the corners thereof rounded, as indicated at 17b, and the recesses 14 are preferably cut deeply enough so that the edges of the clamp 16 will not only be seated within and masked by the side walls of the recess but, when the staples are fully inserted in the holes 18, the outer ends thereof will be substantially flush with outer surfaces of the implant adjacent to the recesses 14.

The provision of the grooves 10e within which the rectus muscles are seated results in obviating the presence of any protruding ridges that would otherwise be formed by said muscles and which otherwise obviously could constitute an impediment to the motion of the implant under the control of the rectus muscles within the patient's eyeball. Likewise, the chamfering of the edge that would otherwise be formed between the grooves 10e and the recesses 14 in which the clamps 15 are secured obviates the presence of any sharp corners at this point that would tend to irritate the muscle and cause discomfort to the patient. The rounding of the outer ends of the staples 17, together with recessing of the clamps and staples within the recesses 14 also insures that there will be no protruding portions tending to cause irritation or discomfort to the patient. As the holes 18 for the legs of the staples 17 extend normal to the plane of the clamps 15, 16, the pull of the rectus muscles on the staples will also be normal to the latter so that there will be no component of the force exerted by the rectus muscles that would tend to loosen the staples or pull them out of the holes 18. When tantalum screen mesh or other foraminated material is used for the clamps 15, 16, it has been found that the muscular tissue of the rectus muscles is forced into the interstices of the clamp material by the clamping action of the staples 17 and tends to grow to, and unite integrally with, the clamps so as to form a permanent bond therewith; so that in time the pull of the muscles is no longer taken by the staples but mainly absorbed directly by the bond of the muscles with the larger area of the clamps 15, 16, the staples serving to hold the ends of the muscles achored to the implant until the muscles adhere and bond to the clamp material.

The complete assembly, which consists of the implant 10 with four of the foundation clamps 15 imbedded in the four rectangular recesses formed at the end of the rectus muscle grooves 10e, four of the clamps 16 and staples 17 which cooperate with the foundation clamps to hold the rectus muscles in place, together with an artificial eye 12 and peg 11, is sold by the prosthetic laboratory to the surgeon; and after the parts have been assembled during the surgical operation, as just described, the four sets of clamps, each set consisting of a foundation clamp 15 and a cooperating clamp 16, together with the staples 17, remain permanently in the patient's eye and, as stated, the rectus muscles will in time adhere and bond substantially permanently to the clamp material. As an artificial eye should be under the complete control of the rectus muscle so that it will function in substantially identically the same way as the natural eye, all four of the sets of clamps cooperate at all times substantially in unison to impart to the eye perfectly natural movement, either vertically, horizontally or in oblique directions. In fact, this is one of the most important, highly successful and advantageous results obtained by the prosthetic device of the present invention.

As a number of applications of the invention have already been made, the invention has been demonstrated in actual practice to be vastly superior to constructions heretofore employed; highly unexpected and gratifying results being obtained from the use thereof.

It will, of course, be understood that, while the use of tantalum wire mesh has proven to be highly successful in actual practice for the clamps 15, 16, the invention is not limited to the use thereof but that, as heretofore indicated, other noncorrosive materials may be substituted for tantalum, such, for example, as thin sheets of plastic suitably foraminated to provide interstices into which the muscular tissue of the rectus muscles may project so as to unite integrally with the clamp material in time. It will likewise be understood that many changes, variations and modifications may be resorted to that will suggest themselves to persons skilled in the art to which the present invention relates without departing from the spirit of the invention as set forth in the claims hereunto appended.

I claim:

1. In a prosthetic device of the type wherein an implant having a substantially spherical posterior main body portion and a reduced neck adjacent to its anterior portion is inserted into an eye socket and is provided with means for the attachment thereto of the rectus eye muscles, and means in the anterior portion of said implant for attaching an artificial eye to the front part of said implant, characterized by the main body portion of said implant being provided with a plurality of grooves extending from adjacent to the posterior of said main body to a point adjacent to said reduced neck portion of said implant, each of said grooves being adapted to receive one of the rectus eye muscles.

2. In a prosthetic device of the type wherein an implant having a substantially spherical posterior main body portion and a reduced neck adjacent to its anterior portion is inserted into an eye socket and is provided with means for the attachment thereto of the rectus eye muscles, and means in the anterior portion of said implant for attaching an artificial eye to the front part of said implant, characterized by the main body portion of said implant being provided with a plurality of grooves extending from adjacent to the posterior of said main body to a point adjacent to said reduced neck portion of said implant, each of said grooves being adapted to receive one of the rectus eye muscles, and a recess communicating with the front end of each groove, a foraminated inner clamp seated securely within said recess, a cooperating foraminated outer clamp between which and said inner clamp the end of said muscle is confined, and clamp holding means carried by said implant for holding said outer clamp in clamped engagement with the end of a rectus muscle against said inner clamp.

3. In a prosthetic device of the type wherein an implant having a substantially spherical posterior main body portion and a reduced neck adjacent to its anterior portion is inserted into an eye socket and is provided with means for the attachment thereto of the rectus eye muscles, and means in the anterior portion of said implant for attaching an artificial eye to the front part of said implant, characterized by the main body portion of said implant being provided with a plurality of grooves extending from adjacent to the posterior of said main body to a point adjacent to said reduced neck portion of said implant, each of said grooves being adapted to receive one of the rectus eye muscles, and a recess communicating with the front end of each groove, a foraminated inner clamp seated securely within said recess, and a cooperating foraminated outer clamp between which and said inner clamp the end of said muscle is confined, the juncture of each of said grooves with its cooperating recess being chamfered to provide a smooth transition surface between each groove and recess thereby to avoid the presence of a sharp edge at said juncture, and fastening means extending through said clamps and said muscle projecting into the main body portion of said implant to hold said clamps in clamping engagement with said muscle and said implant.

4. In a prosthetic device of the type wherein an implant having a substantially spherical posterior main body portion and a reduced neck adjacent to its anterior portion is inserted into an eye socket and is provided with means for the attachment thereto of the rectus eye muscles, and means in the anterior portion of said implant for attaching an artificial eye to the front part of said implant, characterized by the main body portion of said implant being provided with a plurality of grooves extending from adjacent to the posterior of said main body to a point adjacent to said reduced neck portion of said implant, each of said grooves being adapted to receive one of the rectus eye muscles, and a recess communicating with the front end of each groove, a foraminated inner clamp seated securely within said recess, and a cooperating foraminated outer clamp between which and said inner clamp the end of said muscle is confined, and fastening means extending through said clamps and said muscle and projecting into the main body portion of said implant to hold said clamps in clamping engagement with said muscle, said fastening means comprising a U-shaped staple having a pair of spaced legs terminating at their outer ends in sharp points and a connecting bridge extending between the inner ends of said legs for engaging the outer face of said outer clamp and the main body portion of said implant being provided with a pair of rearwardly inclined spaced holes in which the legs of said staple fit neatly thereby to hold said staple and clamps in clamping engagement with said muscle.

5. In a prosthetic device of the type wherein an implant having a substantially spherical posterior main body portion and a reduced neck adjacent to its anterior portion is inserted into an eye socket and is provided with means for the attachment thereto of the rectus eye muscles, and means in the anterior portion of said implant for attaching an artificial eye to the front part of said implant, characterized by the main body portion of said implant being provided with a plurality of grooves extending from adjacent to the posterior of said main body to a point adjacent to said reduced neck portion of said implant, each of said grooves being adapted to receive one of the rectus eye muscles, and a recess communicating with the front end of each groove, a foraminated inner clamp seated securely within said recess, and a cooperating foraminated outer clamp between which and said inner clamp the end of said muscle is confined, and fastening means extending through said clamps and said muscle and projecting into the main body portion of said implant to hold said clamps in clamping engagement with said muscle, said fastening means comprising a U-shaped staple having a pair of spaced legs terminating at their outer ends in sharp points and a connecting bridge extending between the inner ends of said legs for engaging the outer face of said outer clamp and the main body portion of said implant being provided with a pair of rearwardly inclined spaced holes in which the legs of said staple fit neatly thereby to hold said staple and clamps in clamping engagement with said muscle; the angle of inclination of said holes being normal to the plane of said clamps whereby the pull of the muscle on said staple will be normal to the latter.

6. In a prosthetic device of the type wherein an implant having a substantially spherical posterior main body portion and a reduced neck adjacent to its anterior portion is inserted into an eye socket and is provided with means for the attachment thereto of the rectus eye muscles, and means in the anterior portion of said implant for attaching an artificial eye to the front part of said implant, characterized by the main body portion of said implant being provided with a plurality of grooves extending from adjacent to the posterior of said main body to a point adjacent to said reduced neck portion of said implant, each of said grooves being adapted to receive one of the rectus eye muscles, and a recess communicating with the front end of each groove, a foraminated inner clamp seated securely within said recess, and a cooperating foraminated outer clamp between which and said inner clamp the end of said muscle is confined, and fastening means extending through said clamps and said muscle and projecting into the main body portion of said implant to hold said clamps in clamping engagement with said muscle, said fastening means comprising a U-shaped staple having a pair of spaced legs terminating at their outer ends in sharp points and a connecting bridge extending between the inner ends of said legs for engaging the outer face of said outer clamp and the main body portion of said implant being provided with a pair of rearwardly inclined spaced holes in which the legs of said staple fit neatly thereby to hold said staple and clamps in clamping engagement with said muscle, the angle of inclination of said holes being normal to the plane of said clamps whereby the pull of the muscle on said staple will be normal to the latter, and said recess being of such depth that the walls thereof will completely mask the edges of said clamps.

7. In a prosthetic device of the type wherein an implant having a substantially spherical posterior main body portion and a reduced neck adjacent to its anterior portion is adapted to be inserted into an eye socket and is provided with means for the attachment thereto of the rectus eye muscles, and means in the anterior portion of said implant for attaching an artificial eye to the front part of said implant, characterized by said implant being provided with a pair of cooperating clamps for each of said rectus muscles having cooperating clamping surfaces between which the end portion of the muscle is adapted to be engaged, and a clamp holding means for each of said pair of clamps securing said clamps in engagement with said implant.

8. In a prosthetic device of the type wherein an implant having a substantially spherical posterior main body portion and a reduced neck adjacent to its anterior portion is adapted to be inserted into an eye socket and is provided with means for the attachment thereto of the rectus eye muscles, and means in the anterior portion of said implant for attaching an artificial eye to the front part of said implant, characterized by said implant being provided with a pair of cooperating foraminated clamps for each of said rectus muscles having cooperating clamping surfaces between which the end portion of the muscle is adapted to be engaged, and a clamp holding means for each of said pair of clamps securing said clamps in engagement with said implant.

9. In a prosthetic device of the type wherein an implant having a substantially spherical posterior main body portion and a reduced neck adjacent to its anterior portion is adapted to be inserted into an eye socket and is provided with means for the attachment thereto of the rectus eye muscles, and means in the anterior portion of said implant for attaching an artificial eye to the front part of said implant, characterized by said implant being provided with a pair of cooperating foraminated clamps for each of said rectus muscles having cooperating clamping surfaces between which the end portion of the muscle is adapted to be engaged, and a clamp holding means for each of said pair of clamps securing said clamps in tight engagement with said muscle and said implant, comprising a fastening device passing through said clamps and muscle and secured within the main body portion of said implant.

10. In a prosthetic device having an implant member adapted to be inserted into an eye socket, means for attaching the rectus eye muscles to said implant member comprising a muscle engaging surface united to said implant member, a clamp member superimposed upon said muscle engaging surface, and means securing said clamp member to said implant member.

11. The invention set forth in claim 10 wherein said muscle engaging surface comprises a thin sheet of foraminated material.

12. The invention set forth in claim 10 wherein said clamp member is formed of foraminated material.

13. The invention set forth in claim 10 wherein said muscle engaging surface is located within a recess formed in said implant member.

14. The invention set forth in claim 10 wherein a recess of a depth sufficient to mask the edges of said clamp member when the latter is in attached position is provided in said implant member.

15. The invention set forth in claim 10 wherein said muscle engaging surface is located within a recess formed in said implant member, and said implant member is provided with a groove communicating with said recess and adapted to receive said muscle.

16. The invention set forth in claim 1 further characterized by the main body portion of said implant being provided with a recess communicating with the anterior end of each of said grooves and means located within said recess for attaching the end of a rectus eye muscle to said implant member.

17. The invention set forth in claim 3 wherein said means for securing said second muscle engaging member to said implant member comprises a member including a pointed prong passing through said first and second muscle engaging members and a rectus eye muscle, and an aperture formed in the main body of said implant member for holding said prong, said members and said muscle securely attached to said implant.

CONRAD J. NOELLE.

REFERENCES CITED

The following references are of record in the file of this patent:

Article in "American Journal of Ophthalmology," vol. 32, #2, February 1949, page 253, Figure 1. "A Universal Type Integrated Implant," by N. L. Cutler. Copy in Div. 55 of the Patent Office.

Article in "American Journal of Opthalmology," vol. 29, #8, August 1946, pages 947 and 950, Figure 7. "Plastic Eye Implant," by A. D. Ruedemann. Copy in Div. 55 of the Patent Office.